Oct. 10, 1961 C W. MUSSER 3,003,748
CABLE RETRACTOR
Filed Nov. 17, 1959 2 Sheets-Sheet 1
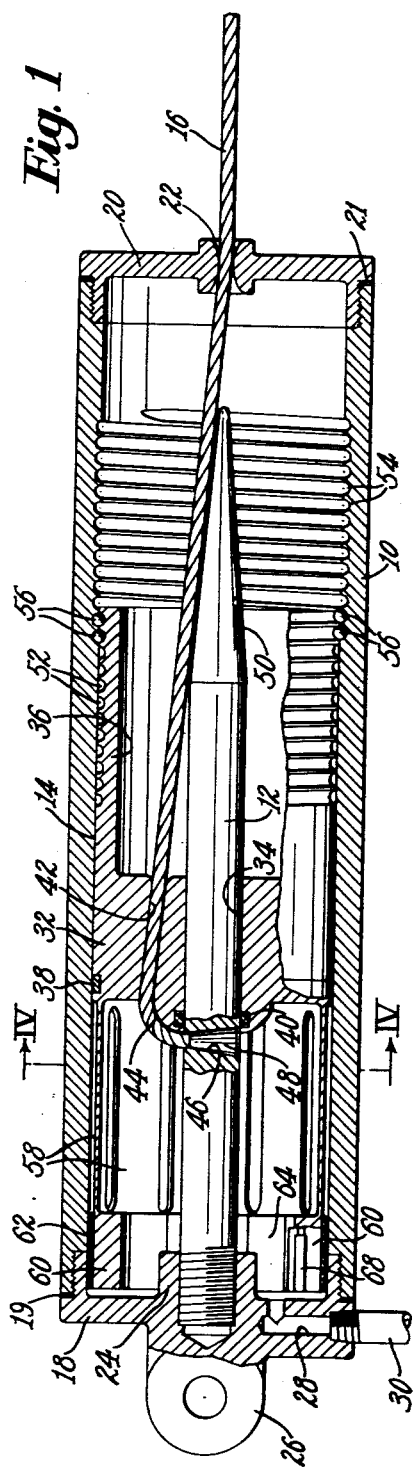
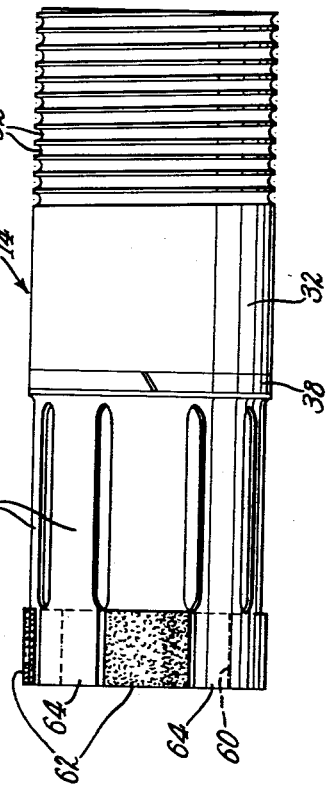
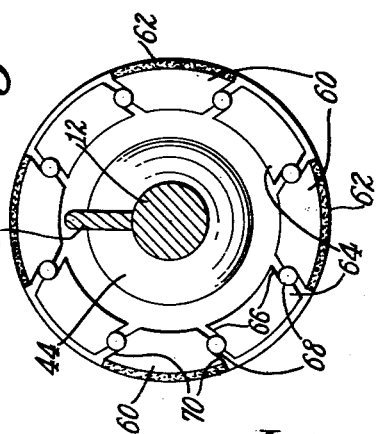
*Inventor*
C Walton Musser
By his Attorney
Robert L. Geist Oct. 10, 1961  C W. MUSSER  3,003,748
CABLE RETRACTOR
Filed Nov. 17, 1959  2 Sheets-Sheet 2
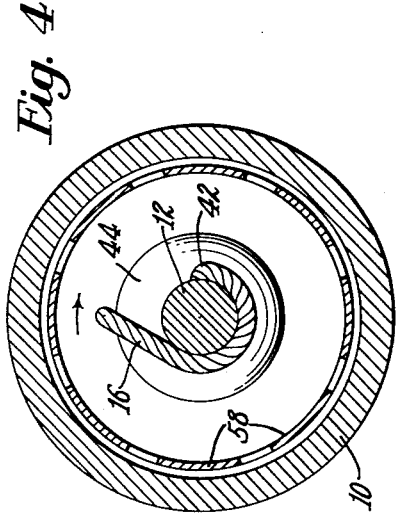
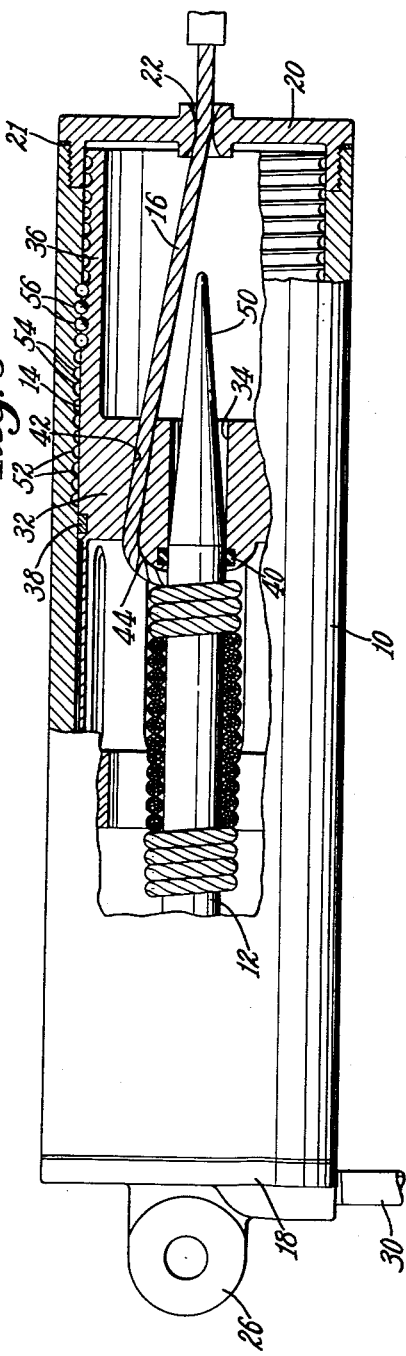

United States Patent Office 3,003,748
Patented Oct. 10, 1961

3,003,748
CABLE RETRACTOR
C Walton Musser, Beverly, Mass., assignor to United Shoe Machinery Corporation, Flemington, N.J., a corporation of New Jersey
Filed Nov. 17, 1959, Ser. No. 853,595
8 Claims. (Cl. 254—150)

This invention has to do with mechanisms for operating emergency devices, and, more particularly, with mechanisms for quickly retracting cables to which such devices are connected.

It frequently happens, in various fields of engineering, that a sudden pull is required. Examples of this occur in the aircraft field, where it is sometimes desirable to operate quickly a buoy release, a rocket signal, stowage disposal apparatus, or seat ejectors, and in other fields, operation of fire doors, hatches, or burglar alarms.

Many mechanisms used require a rapid pull, instead of a thrust, on some mechanical element such as, for example, a cable, but weight and space factors are often such that the pull must be accomplished by means of light, compact mechanism.

In view of the above, an object of the invention is to provide mechanism for exerting a pull for actuating a mechanical element which will be comparatively simple in construction while at the same time will occupy little space and have little weight.

Accordingly, in one aspect of the invention and as illustrated I have provided mechanism for exerting a pull upon a cable comprising a casing, an arbor within the casing, a winding element, which may be in the form of a piston, within the casing and mounted on the arbor for movements of translation and rotation relatively thereto, a cable extending into the casing in operative relation to the winding element and secured to the arbor, and means for supplying fluid under pressure to the interior of the casing to effect movements of the winding element whereby the cable is wound upon the arbor.

This mechanism is particularly advantageous in that by winding the cable with successive turns closely positioned upon the arbor a considerable length of cable can be wound upon an arbor which may occupy very little space. Thus, the throw of a device actuated by the cable can be several times the length of the mechanism itself.

Preferably, and as shown, the winding element is provided with braking elements frictionally engaging the casing for the purpose of controlling the velocity of movement of the winding element. Thus, although the cable is retracted rapidly, the velocity of its movement can be controlled within any desired limits.

These and other features of the invention are shown in the accompanying drawings, described in the following specification, and set forth in the claims.

In the drawings,

FIG. 1 is a view, partly in longitudinal cross section, of a cable retractor illustrating one embodiment of my invention and showing the piston in retracted position prior to a cable retracting operation;

FIG. 2 is a view in side elevation of the piston and brake mechanism shown in FIG. 1;

FIG. 3 is an end view on an enlarged scale of the piston and brake mechanism shown in FIG. 2;

FIG. 4 is a cross sectional view on an enlarged scale taken along line IV—IV of FIG. 1, and FIG. 5 is a side view partly in section of the cable retractor showing the piston in the position occupied after a cable retracting operation.

The cable retracting mechanism, FIG. 1, comprises a casing 10 having therein a fixed arbor 12 and a piston 14 slidably mounted in the casing upon the arbor for movements of translation and rotation relatively thereto, under the action of fluid, under pressure, led into the casing, and a cable 16 extending into the casing, through the piston, and secured to the arbor, so that as the piston advances along the arbor and rotates on the arbor, a pull is applied to the cable as a result of the cable being wound upon the arbor.

The casing which is preferably cylindrical in shape is closed at its inner end by a screw-threaded cap 18, sealed by a gasket 19, the outer end of the casing being partially closed by a similar cap 20, sealed by a gasket 21, and having a central opening 22 through which the cable 16 passes.

The cap 18 has a boss 24, extending axially of the casing, into which the arbor 12 is threaded. On the cap 18 there is a lug 26 by which the casing can be secured to a suitable support.

Fluid under pressure is led into the casing through a passage 28 from a supply line 30. Conveniently, the fluid may be hydraulic or pneumatic in nature, and for example, could be spent gases from an explosive charge.

As shown in FIG. 1, the piston 14 has a comparatively massive central portion 32 having a bore 34 through which the arbor 12 passes, and a forwardly extending flange 36 engaging the walls of the casing. A piston ring 38 acts as a seal between the casing and the portion 32 of the piston, and there is a sealing ring 40 between the portion 32 and the arbor 12.

The cable 16 extends through the opening 22 and through a bore 42 in the portion 32 at an angle to the axis of the arbor, and thence over a smooth convex boss 44 integral with the piston, and into a tapered bore 46 in the arbor in which it is secured by a tapered plug 48 at its end.

The outer end of the arbor is tapered as indicated at 50. This provides for clearance of the cable in passing to the bore 42, the tapered portion of the arbor serving as a guide for the cable.

In order to provide for movements of the piston 14 in exerting a pull upon the cable 16 and for winding the cable upon the arbor 12, the flange 36 of the piston is provided externally with helical grooves 52 and the casing 10 is provided internally with helical grooves 54 of the same helix angle as the grooves 52.

The grooves 54 are located somewhat to the right of the central portion of the casing, FIG. 1, and with the piston 14 in its normal or retracted position as shown in that figure, overlap the grooves 52 by somewhat over two turns within which are positioned ball bearings 56.

Overlapping portions of the grooves 52 and 54 serve as raceways for the ball bearings 56 during translational movements of the piston.

It is to be noted the pitch of the grooves is substantially equal to the diameter of the cable. Thus, when pressure is applied to the piston the ball bearings effect rotation of the piston during its translational movement to the extent that for a complete rotation of the piston the latter advances along the arbor by a distance of one cable diameter.

During such a rotation the bore 42 revolves once around the arbor carrying the cable with it to wind one turn of cable on the arbor. The amount of cable pulled into the casing, through the bore, and wound on the arbor depends on the diameter of the arbor, the length of cable wound per turn increasing with the diameter of the arbor.

Successive rotations of the piston until it reaches the end of the casing result in closely wound turns of the cable as shown in FIG. 4.

As the piston rotates it moves bodily, supported by the balls, and also moves relatively to the balls as they roll along the grooves 54 in such manner that when the piston has made one turn the balls have moved along the grooves essentially one-half turn. Thus, when the piston has moved through about twice its length from its retracted position, FIG. 1, to the position shown in FIG. 4, it has made twenty rotations placing that number of turns of cable upon the arbor. At the same time the ball bearings have made approximately ten turns, advancing along the grooves 54 of the casing.

In order to control the velocity of retraction of the cable I preferably provide a braking device associated with the piston 14.

As shown in FIGS. 1 and 3 this device includes fingers 58, integral with the piston and terminating in thickened portions constituting weights which are adapted to be thrown outwardly by centrifugal force upon rotation of the piston.

As shown, there are eight weights arranged about the axis of the casing; the weights 60 are provided with suitable brake lining material 62 adapted to engage the inner walls of the casing. The intermediate weights 64 are constructed and arranged to act upon weights 60 in such manner as to increase the pressure of the weights 60 upon the casing during their operation. To this end inner portions of the weights 64 are wedge shaped and are provided with cam faces 66 arranged to engage rollers 68 on each side of weights 64 and which in turn engage outer wedge shaped portions of the weights 60 having cam faces 70.

Thus during rotation of the piston 14 the weights 60 are thrown outwardly to force the brake linings 62 against the walls of the casing. At the same time the weights 64 are also forced outwardly and the cam surfaces 66 cramp the rollers 68 against the cam surfaces 70 in directions to apply additional pressure tending to force the weights 60 and linings 62 against the casing in producing increased braking effect.

From the foregoing description it will be evident that I have provided mechanism, for exerting a pull upon a cable effective to retract a considerable length of cable at controlled velocity, which, at the same time, has comparatively few parts and may occupy little space.

Having thus described my invention what I claim as new and desire to secure by Letters Patent of the United States is:

1. A cable retracting device comprising a casing, a fixed arbor extending axially of the casing, a piston in the casing mounted upon the arbor for movements of rotation and translation relatively thereto, a cable extending into the casing and through an opening in the piston spaced from the axis of the arbor and secured to the arbor, and means for supplying fluid under pressure to the interior of the casing to effect movements of the piston to wind the cable upon the arbor.

2. A cable retractor comprising a casing, a fixed arbor within the casing, a piston freely mounted upon the arbor, means for supplying fluid under pressure to the interior of the casing to effect translatory movement of the piston along the arbor, means interengaging the piston and casing to effect rotation of the piston on the arbor during translatory movement of the piston, and a cable extending into the casing through the piston and secured to the arbor whereby fluid under pressure applied to the piston results in winding the cable on the arbor.

3. Mechanism for exerting a pull upon a cable comprising a casing, an arbor within the casing, a winding element within the casing and mounted on the arbor for movements of translation and rotation relatively thereto, a cable extending into the casing in operative relation to the winding element and secured to the arbor, and means for supplying fluid under pressure to the interior of the casing to effect movements of the winding element whereby the cable is wound upon the arbor.

4. A cable retractor comprising a casing, a fixed arbor extending axially of the casing, a cable winding element in the casing mounted upon the arbor for movements of rotation and translation relatively thereto, a cable extending into the casing and through an opening in the winding element and secured to the arbor, and means for supplying fluid under pressure to the interior of the casing whereby to effect translatory and rotative movements of the winding element in winding the cable upon the arbor.

5. A cable retractor comprising a casing, an arbor within the casing and extending axially thereof, a piston loosely mounted upon the arbor, helical grooves formed in the inner wall of the casing and exterior wall of the piston, ball bearings located in the grooves interengaging the casing and piston, a cable extending into the casing, through an opening in the piston, and secured to the arbor, and means for applying pressure to the piston thereby to cause rotary and translatory movement of the piston to effect winding of the cable upon the arbor.

6. A cable retractor comprising a casing, an arbor within the casing and extending axially thereof, a piston loosely mounted upon the arbor, helical grooves of the same helix angle formed in the inner wall of the casing and exterior wall of the piston, ball bearings located in the grooves interengaging the casing and piston, a cable extending into the casing, through an opening in the piston, and secured to the arbor, the diameter of the cable being substantially equal to the pitch of the grooves, and means for applying pressure to the piston thereby to cause rotary and translatory movement of the piston to effect winding of the cable upon the arbor.

7. A cable retractor comprising a casing, a fixed arbor within the casing, a piston freely mounted upon the arbor, means for supplying fluid under pressure to the interior of the casing to effect translatory movement of the piston along the arbor, means interengaging the piston and casing to effect rotation of the piston on the arbor during translatory movement of the piston, a cable extending into the casing through the piston and secured to the arbor whereby fluid under pressure applied to the piston results in winding the cable on the arbor, and braking elements carried by the piston and engaging the casing for controlling the velocity of the piston during its translatory movement.

8. Mechanism for exerting a pull upon a cable comprising a casing, an arbor within the casing, a winding element within the casing and mounted on the arbor for movements of translation and rotation relatively thereto, a cable extending into the casing in operative relation to the winding element and secured to the arbor, means for supplying fluid under pressure to the interior of the casing to effect movements of the winding element whereby the cable is wound upon the arbor, and braking elements carried by the winding element for controlling the velocity of its translatory movement.

References Cited in the file of this patent
UNITED STATES PATENTS

| | | |
|---|---|---|
| 2,613,915 | Stone | Oct. 14, 1952 |
| 2,688,951 | Sears | Sept. 14, 1954 |